(12) United States Patent
Camacho et al.

(10) Patent No.: US 9,736,656 B1
(45) Date of Patent: Aug. 15, 2017

(54) METHOD OF VERIFYING THE STATUS OF A UNIQUE MOBILE DEVICE IDENTIFIER

(71) Applicant: GM GLOBAL TECHNOLOGY OPERATIONS LLC, Detroit, MI (US)

(72) Inventors: Esteban Camacho, Belleville, MI (US); Alexander Cermak, Grosse Pointe Woods, MI (US); Dexter Lowe, Sterling Heights, MI (US); Ryan Olejniczak, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/235,910

(22) Filed: Aug. 12, 2016

(51) Int. Cl.
  *H04W 4/04* (2009.01)
  *H04L 29/08* (2006.01)
  *H04W 4/00* (2009.01)

(52) U.S. Cl.
  CPC .......... *H04W 4/046* (2013.01); *H04L 67/303* (2013.01); *H04L 67/306* (2013.01); *H04W 4/008* (2013.01)

(58) Field of Classification Search
  None
  See application file for complete search history.

(56) References Cited

U.S. PATENT DOCUMENTS

| | | | |
|---|---|---|---|
| 2014/0200740 A1 | 7/2014 | Lavi et al. | |
| 2014/0270172 A1 | 9/2014 | Peirce | |
| 2014/0328248 A1* | 11/2014 | Greubel | H04W 8/005 370/328 |
| 2015/0133108 A1 | 5/2015 | Ahmed et al. | |
| 2015/0170439 A1* | 6/2015 | Chen | G07C 5/008 701/31.4 |
| 2015/0208457 A1 | 7/2015 | Thanayankizil et al. | |

* cited by examiner

Primary Examiner — David Bilodeau (57) ABSTRACT

A method of verifying the status of a unique mobile device identifier associated with an established user account. The method including: receiving one or more data transmissions comprising at least one unique mobile device identifier; storing the at least one mobile device identifier as a current mobile device identifier in one or more databases; determining if validating data corresponding to the vehicle user account has been modified before storing the current mobile device identifier and after storing a previously-provided mobile device identifier; determining if the time difference between storing the current mobile device identifier and storing the previous mobile device identifier is greater than or equal to a predetermined time duration; determining if one or more vehicle registration records indicate a records modification before storing the current mobile device identifier and after storing the previously-provided mobile device identifier; in certain instances, modifying the status of the current mobile device identifier.

19 Claims, 2 Drawing Sheets

METHOD OF VERIFYING THE STATUS OF A UNIQUE MOBILE DEVICE IDENTIFIER

Vehicles may include telematics systems that may have the capability of communicating using short-range wireless communications (SRWC) such as Bluetooth. In addition, some modern cellular telephones include features and software applications beyond mere telephony such as the ability to utilize SRWC. Cellular telephones may moreover establish SRWC with the telematics systems and subsequently control certain vehicle operations. In certain instances, such as when the vehicle changes ownership, cellular telephones may retain the ability to establish SRWC with the telematics systems of the previously owned vehicle and thus undesirably control certain vehicle operations.

SUMMARY

A method of verifying the status of a unique mobile device identifier associated with an established vehicle user account is herein presented. The method including: receiving (at a controller) one or more data transmissions comprising at least one unique mobile device identifier; storing (via the controller) the at least one mobile device identifier as a current mobile device identifier in one or more databases; determining (via the controller) if validating data corresponding to the vehicle user account has been modified before storing the current mobile device identifier and after storing a previously-provided mobile device identifier; determining (via the controller) if the time difference between storing the current mobile device identifier and storing the previous mobile device identifier is greater than or equal to a predetermined time duration; determining (via the controller) if one or more vehicle registration records indicate a records modification before storing the current mobile device identifier and after storing the previously-provided mobile device identifier; and in certain instances, modifying (via the controller) the status of the current mobile device identifier.

The method may further include sending (via a vehicle telematics unit) the one or more data transmissions comprising the at least one unique mobile device identifier at the conclusion of a vehicle ignition cycle. The method may also further include sending (via the controller) one or more data transmissions comprising a challenge message to a vehicle telematics unit of the vehicle associated with the vehicle user account. The challenge message may include a challenge query. The challenge query may include a nonce challenge.

An incorrect response to a challenge query may generate a disconnection event that causes the mobile computing device corresponding to the current mobile device identifier to be barred from establishing short-range wireless communications with a vehicle telematics unit of the vehicle associated with the vehicle user account. The mobile device identifier data transmissions may include a time stamp. The predetermined time duration may be approximately 30 days.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The method described below pertains to vehicles equipped with modular or embedded wireless telephony for communication over a wireless carrier system, as well as a variety of sensors which can detect various vehicle dynamics such as, but not limited to, whether the vehicle door is locked, whether the vehicle engine is running, etc. Modern mobile computing devices, such as Smart phones and other mobile devices, may also wirelessly communicate via the same wireless carrier system. In addition to wireless telephony capability, both vehicle telematics equipment and mobile computing devices may have the capability to communicate via short-range wireless communication (SRWC) such as Bluetooth. Thus, in certain circumstances, it may be advantageous to send an instruction from the mobile computing devices to the vehicle telematics unit over a short-range wireless network. Such instructions may include operator identification information (encrypted or non-encrypted) to supplement certain vehicle operations such as, but not limited to, engine ignition. In some instances, it may be desirable for the vehicle telematics unit to identify the disconnection of certain mobile computing devices without user interaction (e.g., automatically). It may moreover be desirable for the vehicle telematics unit to additionally verify such a disconnection with the current vehicle operator.

Figure 1:
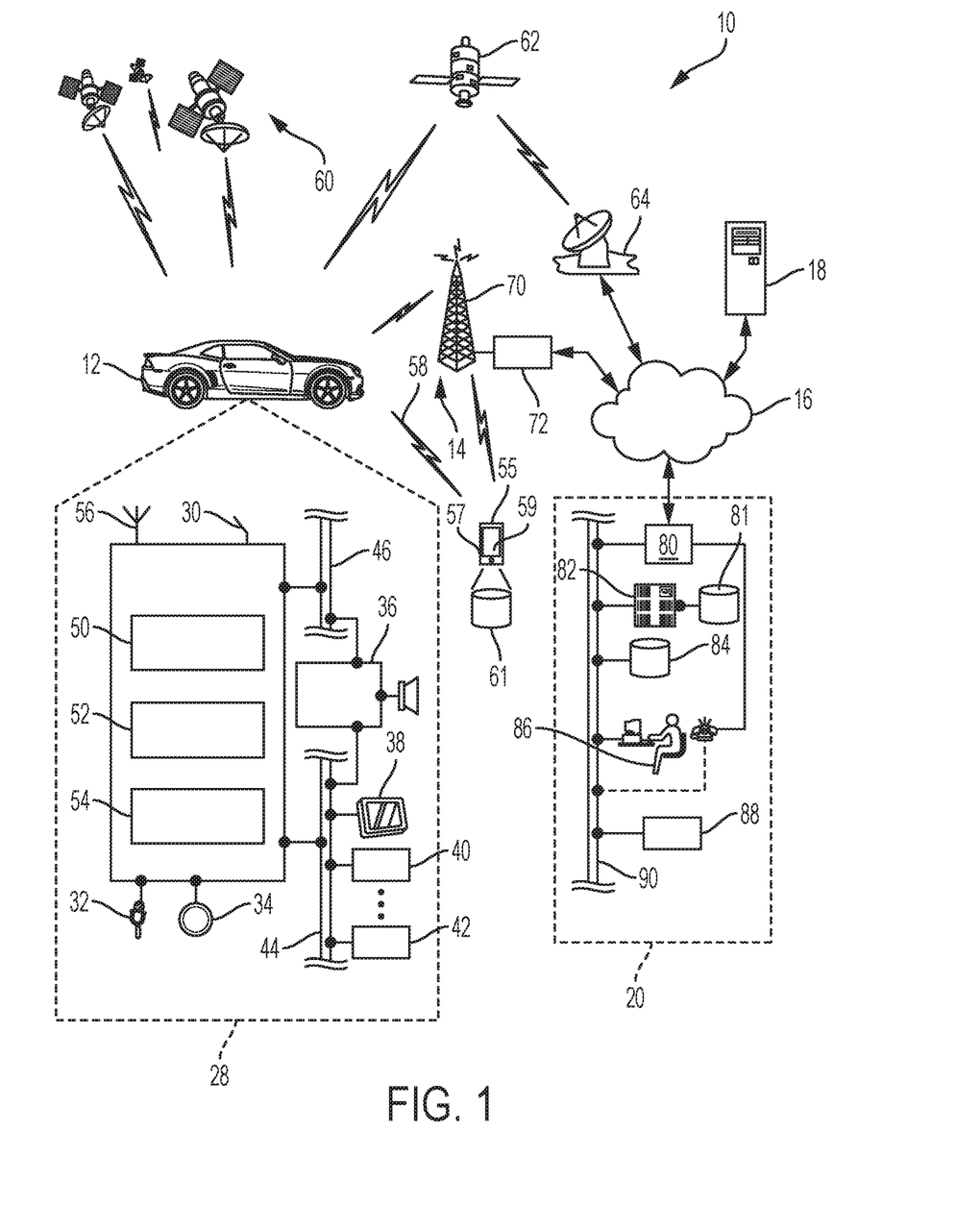
FIG. 1 is a block diagram depicting an exemplary embodiment of a communications system that is capable of utilizing the method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as GSM or CDMA and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a mobile computing device 57, such as a smart phone, personal laptop computer or tablet computer having two-way communication capabilities, a netbook computer, or any suitable combinations thereof. The mobile computing device 57 can include computer processing capability, a transceiver capable of communicating with wireless carrier system 14, a digital camera 55, a visual display 59, and/or a GPS module capable of receiving GPS satellite signals and generating GPS coordinates based on those signals. In some implementations, the display 59 also includes a touch-screen graphical user interface. Digital camera 55 may include the ability to generate digital images that are bitmapped data representations of tangible objects captured and stored by generally known operations of camera 55. Examples of the mobile computing device 57 include the iPhone™ manufactured by Apple, Inc. and the Droid™ manufactured by Motorola, Inc. as well as others. While the mobile computing device 57 may include the ability to communicate via cellular communications using the wireless carrier system 14, this is not always the case. For instance, Apple manufactures devices such as the various models of the iPad™ and iPod Touch™ that include the processing capability, the display 59, and the ability to communicate over a short-range wireless communication link. However, the iPod Touch™ and some iPads™ do not have cellular communication capabilities. Even so, these and other similar devices may be used or considered a type of wireless device, such as the mobile computing device 57, for the purposes of the method described herein.

Mobile device 57 may be used inside or outside of a mobile vehicle (such as the vehicle 12 shown in FIG. 1), and may be coupled to the vehicle by wire or wirelessly. The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless connection (SRWC) protocol (e.g., Bluetooth), mobile computing device 57 and telematics unit 30 may pair one with another (or link to one another) when within a wireless range (e.g., prior to experiencing a disconnection from the wireless network). In order to pair, Bluetooth devices such as mobile computing device 57 and telematics unit 30 may act in a BEACON or DISCOVERABLE MODE having a general identification (ID); Bluetooth pairing is known to skilled artisans. The general identifier (ID) may include, e.g., the device's name, unique identifier (e.g., serial number), class, available services, and other suitable technical information. Mobile computing device 57 and telematics unit 30 may also pair via a non-beacon mode. In these instances, the call center 20 may participate in pairing mobile computing device 57 and telematics unit 30. For example, the call center 20 may initiate the inquiry procedure between the telematics unit 30 and mobile computing device 57. And call center 20 may identify mobile computing device 57 as belonging to the user of vehicle 12 and then receive from the mobile computing device 57 it's unique mobile device identifier and authorize the telematics unit 30 via the wireless communication system 14 to pair with this particular ID. In at least one embodiment, the telematics unit 30 may only pair with other network devices (such as mobile computing device 57) with such authorization. Call center 20 may also make such authorization based upon information reviewed from one or more vehicle-owner user accounts in one or more databases 84, discussed below.

Once pairing is complete, the devices may be bonded as will be appreciated by skilled artisans (i.e., they may recognize one another and/or connect automatically when they are in a predetermined proximity or range of one other. In other words—they may become, at least temporarily, network participants). Call center 20 may also authorize pairing on an individual basis before completion. Call center 20 also has the ability to bar a certain mobile computing device's ability to pair with a telematics unit as well as disconnect previously paired devices.

Typically, as will be appreciated by skilled artisans, in some instances, one device may act as a paging device and the other device may act as a listening device; i.e., one device may operate in a PAGING MODE while the other device may operate in a LISTENING MODE (e.g., the device in the LISTENING MODE may listen according to SRWC protocol periodically, for example, once every 1.28 seconds or 2.56 seconds). In one embodiment, the telematics unit 30 is configured to be the listening device and operate in the LISTENING MODE.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 1xEV-DO) or GSM/GPRS (e.g., 4G LTE). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs) or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. Server 82 can incorporate a data controller 81 which essentially controls the operations of server 82. Controller 81 may control, send, and/or receive data information (e.g., data transmissions) from one or more of the data bases 84 and mobile computing device 57. Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (not shown) connected between the switch 80 and network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Call Center Backend User Account

The user of mobile computing device 57 and the vehicle 12 may create a vehicle-ownership user account. The user may perform tasks to create this account through a variety of devices such as remote computer 18 and mobile computing device 57, when purchasing vehicle 12 at a dealership (not shown), or through live advisor 86 at call center 20. The user account may be stored in database 84 and accessible on server 82 (i.e., to support backend functions). Call center 20 may also access one or more additional remote servers and/or remote databases (e.g., Department of Motor Vehicles databases) to receive information in support of the user account.

The user account may include validating data to verify and/or validate that future login attempts are secure (e.g., granting access only to the user). The validating data may include an account username and account password as well as user information (e.g., driver's license number), mobile computing device information such as, for example, the unique mobile device identifier (i.e., serial number), and vehicle identification information associated with vehicle 12 (i.e., general identifier (ID)). The user account may additionally store a variety of telematics unit parameters and/or user preferences.

The mobile computing device 57 may receive a software application (SW app) to be associated with vehicle 12 and user account. For example, the user of the mobile device may visit an online software application store or web-service and download the SW app therefrom. The mobile computing device 57 may moreover install this SW app onto memory 61 of the mobile computing device 57. SW app may moreover include one or more graphical user interfaces (GUIs) which include one or more prompts to instruct the user to provide information (e.g., validating data) to support user account creation.

Mobile device with the installed SW app may be validated by the call center 20 to ensure an authentic association between mobile computing device 57 and vehicle 12. For example, having downloaded the SW app, the user of the mobile computing device 57 may provide the same validating data into the SW app already provided to the call center 20. In order to authenticate the mobile device, the mobile device may convey this information cellularly to the call center 20. In some instances, this transmission is performed securely using one or more known encryption methodologies. The call center 20 may receive the validating data and verify that the password is associated with the username; further, the call center also may confirm that the mobile computing device 57 remains to be associated with vehicle 12 and/or the user's account.

The mobile device may also automatically provide the unique mobile device identifier (e.g., serial number) to the call center 20, and this identifier may be compared to various data provided to call center 20 to confirm the association remains intact. To accomplish this effort, for example, each unique mobile device identifier may be provided with a time stamp to establish a time difference comparison between the current and most recent previously provided unique mobile computing device identifier. For instance, if the time difference is determined to be greater than or equal to a predetermined time duration (e.g., 30 days), call center 20 may require further information be provided to verify and validate the association is up-to-date or else mobile computing device 57 may be disconnected from vehicle 12 and/or user account. Call center 20 may otherwise provide an indication of acknowledgement and validation to the mobile device. In another example, call center 20 may determine whether the validating data corresponding to the user account has been modified since receipt of the previously provided mobile computing device identifier. Substantive modifications may include an update to the vehicle identification information. In a further example, upon being provided the unique mobile computing device identifier, call center 20 may access one or more remote servers and/or databases to determine whether one or more third-party vehicle registration records (e.g., DMV records) indicate a records modification. The record modification may indicate an update to vehicle ownership; for instance, an indication that the registration for vehicle 12 has been surrendered and/or its ownership title has been transferred to a different vehicle user.

Based upon the association confirmation, call center 20 may require further information of the association between mobile computing device 57 and vehicle 12 and/or the user's account by sending a challenge message to telematics unit 30 (to be completed by the user). After the telematics unit 30 receives the challenge message, telematics unit 30 may generate a challenge or a query (e.g., a nonce challenge) to further safeguard against malicious dealings with vehicle 12.

When the telematics unit 30 receives the challenge message, it may transmit a response message back to call center 20. The response message may include the answer and/or response to the challenge (e.g., username and password, personal credentials, etc.). In some instances, the message may include a digital certificate uploaded to telematics unit 30 via mobile computing device 57 and the message may also be time stamped.

Having validated mobile computing device 57, the mobile device may access the backend user account and configure at least one telematics unit parameter (e.g., a software setting) granting mobile device control of the telematics unit 30 (e.g., enabling remote commands). Alternatively, the user account may be accessed via computer 18. Mobile computing device 57 may thus be configured to transmit a request or command cellularly to the telematics unit 30. It should be appreciated that this data transmission routes first to call center 20 and call center 20 transmits or retransmits the request or command to telematics unit 30 (e.g., also via cellular communication). The telematics unit 30 then receives the request or command and subsequently performs either.

In those instances when a response message fails to provide a correct challenge response, call center 20 may generate a disconnection event that blocks mobile computing device 57 from further establishing an SWRC with telematics unit 30. The disconnection event may include modifying the user account such that the unique mobile device identifier of mobile computing device 57 is recognized as one that is blocked/barred from future SWRC connections.

Method

Figure 2:
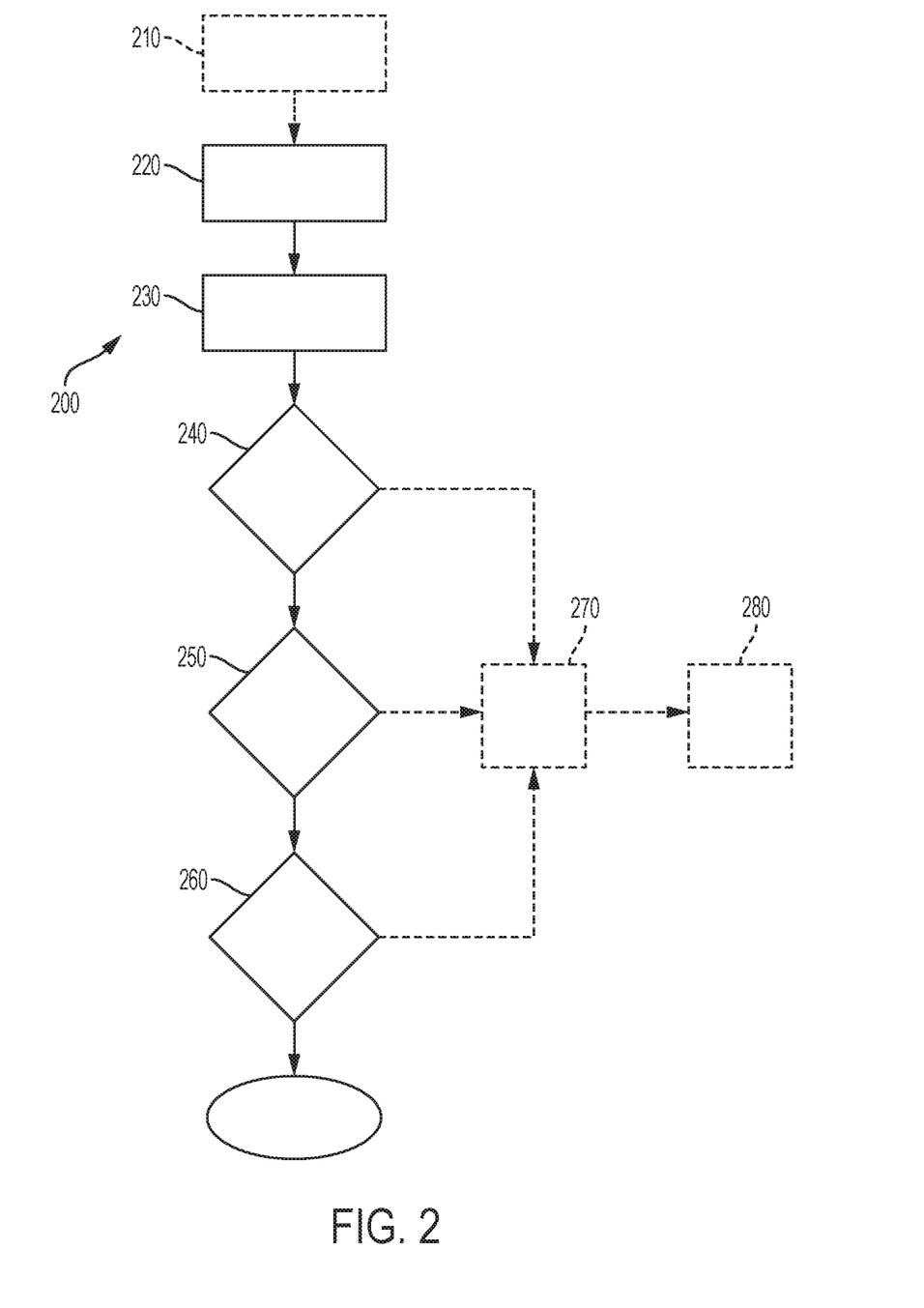
FIG. 2 is a flowchart depicting one exemplary embodiment of the method.

Now turning to FIG. 2, there is shown an embodiment of a method 200 of verifying the status of a unique mobile device identifier associated with an established vehicle user account. One or more aspects of method 200 may be completed through the implementation of controller 52 which may include one or more executable instructions incorporated into memory 54 and executed by of telematics unit 30 and antenna 56. One or more aspects of method 300 may otherwise, for example, be implemented by server 82 of data center 20 which may include one or more executable instructions incorporated into data base 81.

The method is supported by telematics unit 30 being configured to establish an SWRC with one or more devices. This configuration may be made by a vehicle manufacturer at or near the time of the telematics unit's assembly or after-market (e.g., via vehicle download using the aforedescribed communication system 10 or at a time of vehicle service, just to name a couple of examples). In at least one implementation, one or more instructions are provided to the telematics unit 30 and stored on non-transitory computer-readable medium (e.g., on memory 54). The method is further supported by preconfiguring call center 20 with the ability to store one or more user accounts in database 84 and accessible on server 82.

The method optionally includes step 210 in which telematics unit 30 establishing data communications with call center 20 and subsequently transmitting one or more data transmissions with the unique mobile device identifier to data center 20. The data transmission may, for example, be sent at the conclusion of a vehicle ignition cycle and may be sent when an SRWC was established with a mobile computing device 30. The data is thus pushed to data center 20 momentarily after the engine of vehicle 12 is turned off. The data transmission may otherwise be sent upon the activation of the vehicle ignition cycle.

Step 220 includes receiving the data transmissions and unique mobile device identifier at server 82 of call center 20. At step 230, server 82 will store the mobile device identifier in database 84. Server 82 will further designate mobile device identifier as the current identifier stored in database 84. Server 82 may make this designation through known designation methodologies such as, for example, providing a time stamp to associate a specific time at which the mobile device identifier was initially stored into database 84. It should be appreciated that the mobile device identifiers may be stored into database 84 such that they are sorted by ascending order based upon the corresponding time stamp. It should be further appreciated that any stored mobile device identifier not considered current may be considered a previously-provided mobile device identifier.

At step 240, server 82 will access the vehicle user account corresponding to telematics unit 30 and determine whether the validating data in the account has been modified before the time stamp designation of the current mobile device identifier. Server 82 will also determine if this modification was made after the most recent previously-provided mobile device identifier was stored into database 84 (i.e., an indication information has been updated in user account without yet being verified). If server 82 recognizes that the validating data has been modified and has yet to be verified with the current mobile device identifier, method 200 may then move directly to step 280, or indirectly through optional step 270. If server 82 otherwise recognizes that no such modification has been made, method 200 will move to step 250.

At step 250, server 82 will review the time difference between the time stamp designation of the current mobile device identifier and the time stamp designation of the previous mobile device identifier. Server 82 will then determine if this time difference is greater than or equal to a predetermined time duration. The predetermined time duration may be somewhere between 20 and 30 days, which may provide insight to indicate whether the vehicle is in the possession of a new owner. If server 82 recognizes that the time difference is greater than or equal to the predetermined time duration, method 200 may then move directly to step 280, or indirectly through optional step 270. If server 82 otherwise recognizes that the time difference is less than the predetermined time duration, method 200 may move to step 260.

At step 260, server 82 may access one or more remote databases (not shown), which may or may not be facilitated by one or more remote servers. One such remote database, for example, may be a public database provided by the Department of Motor Vehicles of the state of vehicle registration (as reflected in the validating data of the user account). Upon accessing the proper remote database, server 82 may review one or more vehicle registration records to determine whether the records have been modified to indicate a change of vehicle ownership. Such a modification should have been made before the time stamp designation of the current mobile device identifier. Server 82 will also determine if this modification was made after the most recent previously-provided mobile device identifier was stored into database 84 (i.e., an indication information has been changed in user account without yet being verified). If server 82 recognizes that the vehicle registration records reflect there has been a change of vehicle ownership, method 200 may then move directly to step 280, or indirectly through optional step 270. If server 82 otherwise recognizes that no such modification has been made, method 200 will move to completion.

At optional step 270, server 82 may transmit one or more data transmissions including a challenge message to the vehicle telematics unit 30, as discussed above. The data transmissions may prompt telematics unit 30 to generate a challenge query to further safeguard against malicious dealings with vehicle 12. As discussed above, the query may be a nonce challenge.

At optional step 280, server 82 may change the status of the current mobile device identifier in the user account. Such a status change may indicate that the telematics unit 30 requires a challenge query be provided to a vehicle operator before allowing SRWC to be established with mobile computing device 57, so as to safeguard against malicious dealings with vehicle 12. The status change may also indicate a disconnection event has been made. The disconnection event may, for example, block/bar mobile computing device 57 from establishing any future SRWC with telematics unit 30. Server 82 may otherwise generate a disconnection event upon incorrect information being provided in response to the challenge query.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of verifying the status of a unique mobile device identifier associated with an established vehicle user account, the method comprising:
   (a) receiving, at a controller, one or more data transmissions comprising at least one unique mobile device identifier;
   (b) storing, via the controller, the at least one mobile device identifier as a current mobile device identifier in one or more databases;
   (c) determining, via the controller, if validating data corresponding to the vehicle user account has been modified before storing the current mobile device identifier and after storing a previously-provided mobile device identifier;
   (d) determining, via the controller, if the time difference between storing the current mobile device identifier and storing the previous mobile device identifier is greater than or equal to a predetermined time duration;
   (e) determining, via the controller, if one or more vehicle registration records indicate a records modification before storing the current mobile device identifier and after storing the previously-provided mobile device identifier; and
   (f) based on steps (c), (d), and (e), modifying, via the controller, the status of the current mobile device identifier.

2. The method of claim 1, further comprising (g) sending, via a vehicle telematics unit, the one or more data transmissions comprising the at least one unique mobile device identifier at the conclusion of a vehicle ignition cycle.

3. The method of claim 2, wherein the challenge message comprises a challenge query.

4. The method of claim 3, wherein an incorrect response to the challenge query generates a disconnection event that comprises the mobile computing device corresponding to the current mobile device identifier being barred from establishing a short-range wireless communication with a vehicle telematics unit of the vehicle associated with the vehicle user account.

5. The method of claim 1, further comprising (g) sending, via the controller, one or more data transmissions comprising a challenge message to a vehicle telematics unit of the vehicle associated with the vehicle user account.

6. The method of claim 5, wherein the challenge query comprises a nonce challenge.

7. The method of claim 1, wherein the received mobile device identifier data transmissions further comprise a time stamp.

8. The method of claim 1, wherein the predetermined time duration is approximately 30 days.

9. The method of claim 1, wherein the records modification indicates a change in vehicle ownership.

10. A method of verifying the status of a unique mobile device identifier associated with an established vehicle user account, the method comprising:
    (a) sending, via a vehicle telematics unit, one or more data transmissions comprising at least one unique mobile device identifier at the conclusion of a vehicle ignition cycle;
    (b) receiving, at a controller, the one or more data transmissions comprising the at least one unique mobile device identifier;
    (c) storing, via the controller, the at least one mobile device identifier as a current mobile device identifier in one or more databases;
    (d) determining, via the controller, if validating data corresponding to the vehicle user account has been modified before storing the current mobile device identifier and after storing a previously-provided mobile device identifier;
    (e) determining, via the controller, if the time difference between storing the current mobile device identifier and storing the previous mobile device identifier is greater than a duration of 30 days;
    (f) determining, via the controller, if one or more vehicle registration records indicate a change in vehicle ownership before storing the current mobile device identifier and after storing the previously-provided mobile device identifier;
    (g) based on steps (d), (e), and (f), sending, via the controller, one or more data transmissions comprising a challenge message to the vehicle telematics unit;
    (h) based on step (g), prompting, via the vehicle telematics unit, a response to the challenge message; and
    (i) based on step (h), generating a disconnection event, via the controller, comprising the mobile computing device corresponding to the current mobile device identifier being barred from establishing a short-range wireless communication with the vehicle telematics unit.

11. The method of claim 10, wherein the challenge message comprises a challenge query.

12. The method of claim 10, wherein the challenge query comprises a nonce challenge.

13. The method of claim 10, wherein the received mobile device identifier data transmissions further comprise a time stamp.

14. A method of verifying the status of a unique mobile device identifier for a mobile computing device associated with an established vehicle user account so as to safeguard against malicious dealings with a vehicle, the method comprising:
    (a) receiving, at a controller, one or more data transmissions comprising at least one unique mobile device identifier;
    (b) storing, via the controller, the at least one mobile device identifier as a current mobile device identifier in one or more databases;
    (c) determining, via the controller, if validating data corresponding to the vehicle user account has been modified before storing the current mobile device identifier and after storing a previously-provided mobile device identifier, for the purpose of indicating the validating data has been updated without yet being verified;
    (d) determining, via the controller, if the time difference between storing the current mobile device identifier and storing the previous mobile device identifier is greater than or equal to a predetermined time duration;

(e) determining, via the controller, if one or more vehicle registration records, located at one or more remote servers including a public database, indicate a modification to one or more vehicle registration records for the purpose of a change in vehicle ownership before storing the current mobile device identifier and after storing the previously-provided mobile device identifier; and (f) based on any one of steps (c), (d), or (e) being in no particular order, modifying, via the controller, the status of the current mobile device identifier to generate a disconnection event that will block/bar the mobile computing device from establishing any future short range wireless communications (SRWC) with a telematics unit of the vehicle.

15. The method of claim 14, further comprising (g) sending, via a vehicle telematics unit, the one or more data transmissions comprising the at least one unique mobile device identifier at the conclusion of a vehicle ignition cycle.

16. The method of claim 14, further comprising (g) sending, via the controller, one or more data transmissions comprising a challenge message to a vehicle telematics unit of the vehicle associated with the vehicle user account.

17. The method of claim 16, wherein the challenge message comprises a challenge query.

18. The method of claim 14, wherein the received mobile device identifier data transmissions further comprise a time stamp.

19. The method of claim 14, wherein the predetermined time duration is approximately 30 days.

* * * * *